(No Model.) 3 Sheets—Sheet 1.
W. H. CONNELL & J. A. PATTERSON.
CHECK PERFORATOR.
No. 507,674. Patented Oct. 31, 1893.
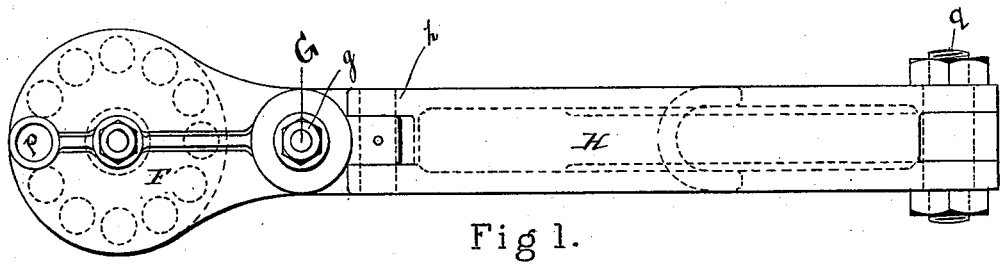
Fig 1.
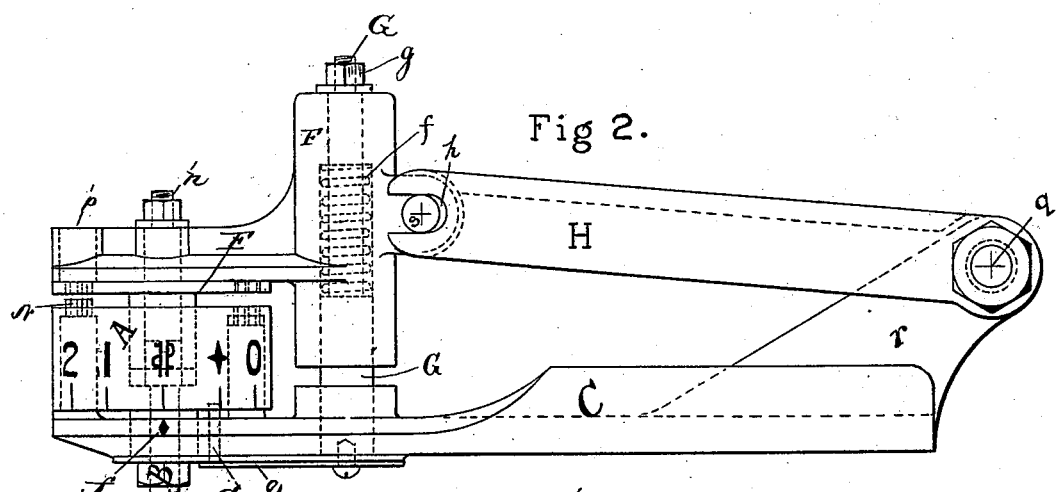
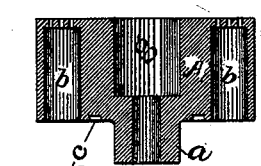
Fig. 3.
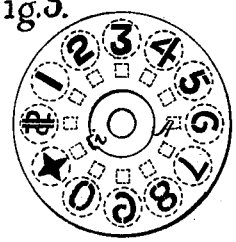
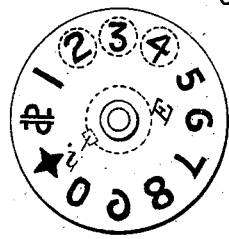
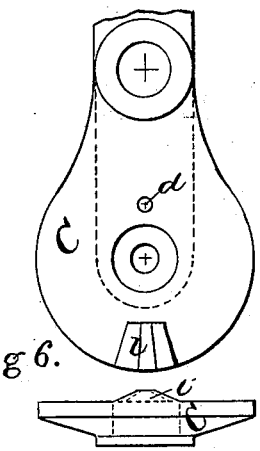
WITNESSES:
Alex J. Stewart
Thomas Durant
INVENTORS
William H. Connell
John A. Patterson
BY
Church & Church
their ATTORNEYS.

(No Model.) 3 Sheets—Sheet 2.

W. H. CONNELL & J. A. PATTERSON.
CHECK PERFORATOR.

No. 507,674. Patented Oct. 31, 1893.

WITNESSES:
Aly Stewart
Thomas Durant

INVENTORS
William H. Connell
John A. Patterson,
BY
Church & Church
their ATTORNEYS.

(No Model.) 3 Sheets—Sheet 3.
W. H. CONNELL & J. A. PATTERSON.
CHECK PERFORATOR.
No. 507,674. Patented Oct. 31, 1893.
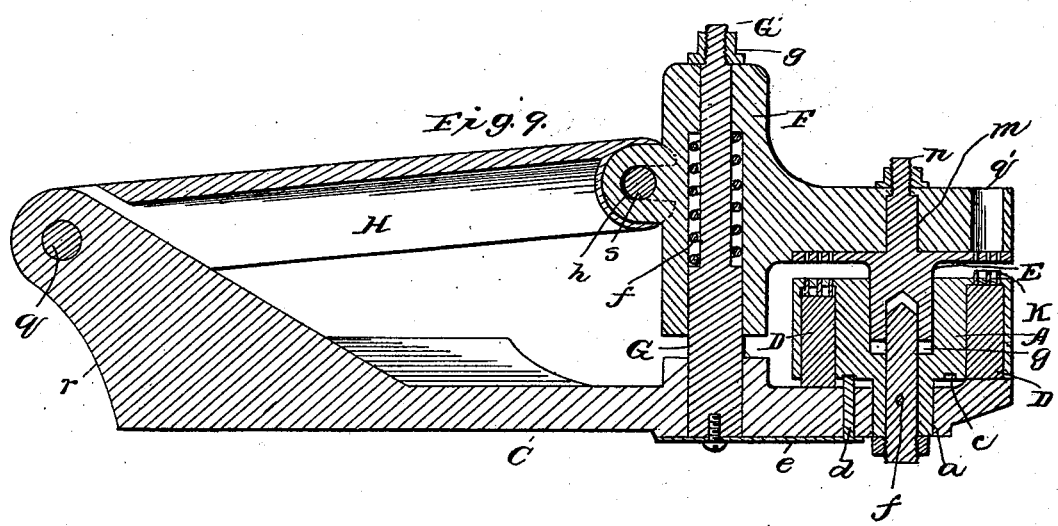

UNITED STATES PATENT OFFICE.

WILLIAM H. CONNELL AND JOHN A. PATTERSON, OF WILMINGTON, DELAWARE.

CHECK-PERFORATOR.

SPECIFICATION forming part of Letters Patent No. 507,674, dated October 31, 1893.

Application filed November 30, 1892. Serial No. 453,680. (No model.)

*To all whom it may concern:*

Be it known that we, WILLIAM H. CONNELL and JOHN A. PATTERSON, of Wilmington, in the county of New Castle and State of Delaware, have invented certain new and useful Improvements in Check-Perforators; and we do hereby declare the following to be a full, clear, and exact description of the same, reference being had to the accompanying drawings, forming a part of this specification, and to the figures of reference marked thereon.

This invention relates to that class of perforating stamps or machines particularly designed for punching out figures or numbers from the body of checks, &c., to denote the amounts for which they are drawn, and it has for its object to provide a simple, convenient and economical device of this character, to which ends it consists in certain novel details of construction and combinations and arrangements of parts all as will be now described and pointed out particularly in the appended claims.

Figure 7:
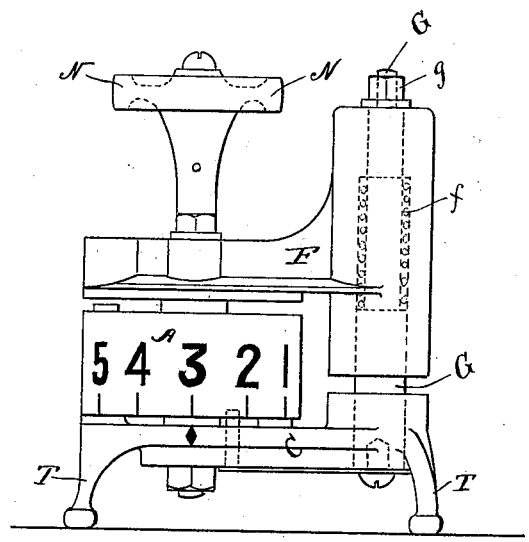
Figure 8:
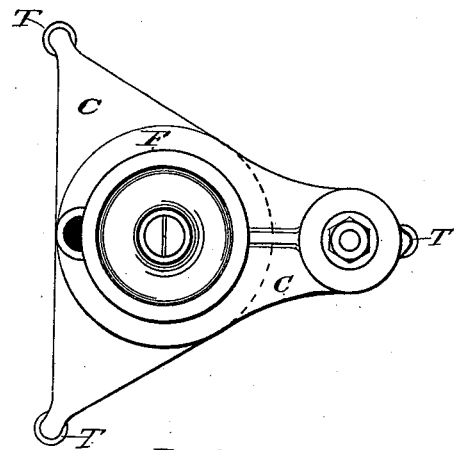

Referring to the accompanying drawings: Figure 1 is a top plan view of the preferred form of stamp. Fig. 2 is a side elevation of the same with underlying parts shown in dotted lines. Fig. 3 is a section and a face view of the punch carrier. Fig. 4 is a side and end elevation of one of the punches. Fig. 5 is a section and a face view of the die plate. Fig. 6 is a plan and an edge elevation of the bottom of the frame. Fig. 7 is an elevation of the stamp mounted on a stand or base. Fig. 8 is a top plan view of the same. Fig. 9 is a longitudinal vertical section through the device shown in Figs. 1 and 2.

Like letters of reference in the several figures denote the same parts.

In designing this invention, it has been our aim to produce an extremely simple device by dispensing with all parts not necessary for the perfect operation of the stamp and at the same time a device which shall be exceedingly compact, adapting it for use as a stamp or punch, designed to be held in the hand. Thus in the drawings, a bottom frame or plate C is provided with a top plate or frame F movable toward and from the bottom plate or frame, said parts being preferably connected by a post or stud G held rigidly in the base and passing through a hub or enlargement in the top frame, with a spring $f$ within the hub for moving the parts away from each other, and a nut $g$ for limiting their outward movement.

Between the oppositely arranged faces of the frame or plates C and F we arrange the punch carrier A and die plate E journaled as will be presently described to rotate in a horizontal plane. The punch carrier A has around its edge a series of transverse seats or guides $b$ corresponding in number to the number of characters to be punched, and each terminates in a reduced aperture at the top, preferably corresponding to the contour of the character or particular punch held by the guide. Thus the top of the punch carrier itself forms a stripper plate which holds the paper when the punch is withdrawn. The punches D are mounted to slide vertically in the guides or in a direction at right angles to the plane in which the punch carrier rotates. Immediately above the punches on the upper portion of the frame is mounted the die plate E preferably journaled to rotate in unison with the punch carrier and having perforations or die openings corresponding exactly with the faces of the punches. In forming these die openings and the openings in the top of the punch carrier we first fit the carrier and die plate together accurately, preferably by forming a seat $g$ in the former and a hub $h$ on the die plate fitting accurately in the seat, with a key $i$ (Fig. 3) to prevent independent rotation while permitting of free longitudinal movement. We then cut the openings through the die plate and top of the punch carrier simultaneously, thereby securing absolute accuracy and insuring the proper passage of the punches no matter what the adjustment of the carrier and die plate may be.

In the preferred construction, the carrier is formed with a downwardly projecting hub $a$ fitting in a corresponding bearing in the frame C and a bolt $a'$ passing through the carrier and frame with a nut B on the outside holds the carrier in position while permitting it to rotate freely.

The projection or hub $h$ on the die plate has a recess therein for the head of the bolt $a'$ as shown, and a hub or upward extension m on the plate passing through a bearing in the frame F with a nut screwed on the small end n, serves to hold it in position on the frame F and allows it to rotate freely in unison with the punch carrier.

Under normal circumstances, the punches ride on the flat surface of the frame C beneath the carrier in which position their upper ends may lie just flush with the surface of the carrier as shown in Fig. 2 and in order to advance any one of the punches into position for punching, a projection i with inclined sides is formed on the frame C (Fig. 6) which projection advances successively the punches as the carrier is rotated. Hence it is a simple matter to turn the carrier to the proper point to advance the desired punch. Then when the check is inserted and the frames pressed toward each other the figure is punched out as will be readily understood.

To hold the punches and carrier in position, the latter is provided on the under side with a series of recesses c, and a pin d projecting through the frame and held advanced by the spring e, co-operates with the recesses to hold the carrier against accidental displacement, under ordinary circumstances, although yielding readily to a positive pressure.

To assist in positioning the punches the carrier is formed with characters on its periphery corresponding to the punch characters, but preferably arranged at an angle of ninety degrees thereto adapting them to register with a point or diamond f, Fig. 2 when the proper punch is in operative position at the front. Above the projection i and in the frame F is formed an opening p for the escape of punchings.

Obviously various means may be employed to press the frames together, but we prefer to employ a construction adapting the device for use similar to a conductor's punch, for which purpose the frame C is extended rearward and provided with a projection r to which the end of a hand piece H is pivoted by a bolt q. This hand piece H has a slot bearing h at the forward end in which works a stud or projection s on the frame F. Thus when the hand piece and frame C are grasped in the hand and pressed together, the frames are moved toward each other and the punch resting on the projection i is caused to penetrate the paper cutting out the portion forming the body of the figure or character.

In Figs. 7 and 8 a different means for operating the punch or stamp is shown adapting the structure for a stand stamp. For this purpose, the hand portion H and extension of frame C are dispensed with and legs T provided for the base frame and for depressing the die plate and upper frame. The hub n of the plate is extended upward in the form of a handle or hand wheel N. This handle not only serves for depressing the die plate to punch the desired character, but also serves as a most convenient means for turning the punch carrier and die plate until the desired punch is brought into operative position.

From the foregoing it will be seen that the device is extremely simple, contains no parts liable to get out of order or become worn or broken through rough usage and may be operated by any one with the greatest accuracy, inasmuch as the die plate being exposed at the bottom of the opening p permits the character at the punching point to be seen and the punch to be located at exactly the desired place.

Having thus described our invention, what we claim as new is—

1. In a check punch, the combination with the two frames, movable toward and from each other, of the punch carrier journaled to rotate on the lower frame, the series of punches sliding in said carrier at right angles to its plane of rotation, with means for advancing the punches and the die plate journaled on the upper frame with connections between the die plate and punch carrier whereby they rotate in unison; substantially as described.

2. In a check punch, the combination with the rotary punch carrier, and the series of independently movable punches mounted to slide therein at right angles to the plane of rotation of the carrier with means for advancing any one punch, of a die plate connected to rotate in unison with said punch carrier, but independently movable toward and from the same and provided with a series of dies corresponding to the punches; substantially as described.

3. In a check punch, the combination with the rotary punch carrier and series of independently movable punches mounted to slide therein at right angles to the plane of rotation of the carrier, with means for advancing the punches of the die plate movable toward and from said carrier and the hub and key connection between the carrier and die plate whereby they are caused to rotate in unison; substantially as described.

4. In a check punch, the combination with a rotary punch carrier, a series of punches sliding therein, a frame in which said carrier is mounted and a stationary projection for advancing any one of the punches, of a die plate rotating in unison with but having an independent movement toward and from the punch carrier; substantially as described, 5. In a check punch, the combination with a rotary punch carrier, a series of punches sliding therein, a frame in which said carrier is mounted, and a stationary inclined sided projection cooperating with the rear ends of the punches to advance the same, of a die plate rotating in unison with but having an independent movement toward and from the punch carrier; substantially as described.

6. In a check punch, the combination with a rotary punch carrier, a series of punches sliding therein, a frame in which said carrier is journaled, a stationary projection for advancing said punches and a spring pin cooperating with the carrier to hold it in adjusted position, of a die plate rotating in unison with but movable toward and from the carrier; substantially as described.

7. In a check punch, the combination with the bottom frame having the rearward extension, the top frame mounted in a fixed guide movable toward and from the bottom frame and the rotary punch carrier and die plate carried respectively by the said frames, of the hand piece H pivotally connected to the bottom frame and cooperating with the top frame to move the same on its fixed guide toward the bottom frame; substantially as described.

8. In a check punch, the combination with the bottom frame having the rearward extension, the top frame, the stud carried by the bottom frame upon which the top frame slides and the rotary punch carrier and die plate carried respectively by the said frames, of the hand piece H pivoted to the bottom frame and cooperating with the top frame to slide the same toward the bottom frame; substantially as described.

WILLIAM H. CONNELL.
JOHN A. PATTERSON.

Witnesses:
LEWIS SASSE,
FREDERICK W. NEUTZE.